Patented Nov. 20, 1951

2,576,009

UNITED STATES PATENT OFFICE 2,576,009

PROCESS FOR ARRESTING THE POLYMERIZATION OF CHLOROPRENE

John R. Goertz, Clarksville, Ind., assignor to E. I. du Pont de Nemours & Company, Wilmington, Del., a corporation of Delaware No Drawing. Application July 22, 1948, Serial No. 40,152

1 Claim. (Cl. 260—92.3)

This invention relates to the short-stopping of the polymerization reaction in the polymerization of chloroprene in aqueous emulsions.

The object of this invention is to provide a process wherein the polymerization of the chloroprene in aqueous emulsion may be stopped at any desired per cent conversion of the monomer to polymer. A further object of the invention is to provide a process which substantially completely stops the polymerization at a point where maximum yields of the chloroprene polymer are obtained having particularly desirable properties.

This invention consists in short-stopping the polymerization of the chloroprene by the use of a combination of two polymerization retarders, namely, thiodiphenylamine and p-tertiarybutyl catechol. These polymerization retarders are added to the emulsion when the desired conversion of monomer to polymer has been reached, the two retarders functioning more efficiently than either one alone at comparable concentrations.

The following example is given to illustrate a preferred method of carrying out the invention, it being understood that various modifications or alterations may be made in the process without departing from the spirit thereof.

EXAMPLE 1

One hundred (100) grams of chloroprene, to which are added 3.0 grams of a disproportionated wood rosin (known commercially as Hercules Resin 731) and 0.30 grams of dodecyl mercaptan, are emulsified at 25° C. in 104 grams of an aqueous solution containing 0.64 gram of solid sodium hydroxide, 0.60 gram of the sodium salt of naphthalene sulfonic acid-formaldehyde condensation product and 0.30 gram of sodium sulfite. The temperature of the emulsion is adjusted to 40° C. and continuous addition of a catalyst solution, consisting of an aqueous solution containing 0.25% of potassium persulfate and 0.0125% of the sodium salt of anthraquinone beta-sulfonic acid, is started. The rate of addition is adjusted to control the polymerization rate so that the temperature of the emulsion is maintained at 40° C. with moderate external cooling. A total of approximately 20 cc. of catalyst solution added over a period of 60 to 90 minutes is usually sufficient to convert about 70% of the chloroprene monomer to polymer, as indicated by the specific gravity rise of the emulsion from 0.973 to 1.053 at 40° C. Catalyst addition then is discontinued and 1.4 grams of a short-stop emulsion is added which consists of 1.0 gram of p-tertiarybutyl catechol and 1.0 gram of thiodiphenylamine dissolved in 64 grams of benzene and emulsified in 34 grams of an aqueous solution containing 1.0 gram of the sodium salt of a naphthalene sulfonic acid-formaldehyde condensation product and 1.0 gram of sodium lauryl sulfate. This 1.4 grams of short-stopping emulsion furnishes approximately 0.05% of each of the inhibitors calculated on the basis of the residual monomer present in the emulsion. This is the preferred concentration of each. Short-stopping of polymerization is thereby obtained so that less than 5% increase in polymer yield is obtained if the unstripped emulsion is aged for 24 hours at 25° C. Lower or higher amounts may be used but for optimum results the concentration of each inhibitor should lie in the range of 0.005% to 0.15%, calculated on the basis of the residual monomer present.

The comparative effectiveness of thiodiphenylamine and of p-tertiarybutyl catechol, alone and in combination, is shown in the table. In this table the polymerization of the chloroprene was carried out in each case in the same system as described in the example above, and the percentages of inhibitors given are calculated on the residual monomer present in the emulsion. The short-stopping emulsion, consisting of the thiodiphenylamine and the p-tertiarybutyl catechol, was added when 78% of the monomer had been polymerized. The unstripped emulsion was then aged for 24 hours at 25° C. to determine the polymer increase in the presence of the polymerization retarder.

Table

|    | Thiodiphenylamine | p-Tertiarybutyl Catechol | Polymer Increase Above 78% on Aging |
|----|----|----|----|
|    | Per cent | Per cent | Per cent |
| 1  | 0    |      | 15 |
| 2  | 0    | 0    | 15 |
| 3  | 0.02 |      | 16 |
| 4  |      | 0.02 | 7  |
| 5  | 0.01 | 0.01 | 2  |
| 6  | 0.04 |      | 14 |
| 7  |      | 0.04 | 6  |
| 8  | 0.02 | 0.02 | 3  |
| 9  | 0.08 |      | 12 |
| 10 |      | 0.08 | 4  |
| 11 | 0.04 | 0.04 | 2  |

The data in the table illustrates that, in the process of short-stopping the polymerization of chloroprene when both monomer and polymer are present in substantial amounts, the addition of a combination of two retarders more nearly completely short-stops the polymerization than when either is used alone at comparable concentrations. Moreover, this substantially complete short-stopping is achieved at considerably lower retarder concentrations than those commonly employed in the art.

While the example illustrates the effectiveness of the combination of inhibitors in the usual alkaline emulsion, a similar effect is obtained in acid or neutral emulsion systems. The inhibitor combination is conveniently added as an emulsion although it may be added and emulsified in the polymerization system with similar effect.

This combination of inhibitors may be used to short-stop polymerization in other chloroprene emulsion systems. The emulsifying agent instead of the sodium salt of a disproportionated wood rosin may be, for example, a potassium or ammonium salt or it may be an alkali salt of a wood rosin or modified rosins such as the hydrogenated rosins, etc., a long carbon chain carboxy acid, a sulfated long chain alcohol, or it may be a quaternary ammonium halide or sulfate. Likewise, the modifier may be an 8 to 16 carbon mercaptan, sulfur, a dialkyl dixanthogen, iodoform, etc. Short-stopping may be effected also in the absence of a modifier. As catalyst, there may be used any of the customary initiators of polymerization such as benzoyl peroxide, hydrogen peroxide, the alkali salts of peroxy acids, tertiary butyl hydroperoxide, the complex cyanides, etc., either alone or in combination.

It is well known to those working in this art that the characteristics of polymers prepared from polymerizable monomers vary with the conditions of preparation and with the extent of conversion of monomer to polymer. Likewise, it has been disclosed in the art that various compounds selected from the class of diaryl amines and the class of aromatic polyhydroxy compounds individually act as retarders of polymerization. However, the prior art does not indicate that the retardation of polymerization may be effectively increased to an unexpected degree by using two particular retarders as compared with the results obtained by using a comparable concentration of either alone. The prior art furthermore does not teach that by using a combination of retarders substantially complete short-stopping of polymerization can be achieved at total retarder concentrations far less than those commonly employed when using a single retarder.

The effective short-stopping of the polymerization of chloroprene by the combination of retarders of this invention makes possible the preparation of products whose characteristics are critically dependent upon the extent of conversion of monomer to polymer. Furthermore, the present invention provides effective short-stopping of the polymerization with the use of the lowest practical concentration of retarders, which is highly desirable in order to minimize the effects of the compounds employed on the color, curing rate, etc., of the isolated products.

The present invention is applicable to the short-stopping of the polymerization of chloroprene alone or when polymerized in mixtures with minor amounts of a monomer or monomers copolymerizable therewith.

I claim:

In the process of polymerizing chloroprene in aqueous emulsions, the step of short-stopping the polymerization at any desired point which comprises intimately incorporating in the polymerization mass from 0.005% to 0.15%, calculated on the residual monomer present in the polymerization mass, of each of the compounds thiodiphenylamine and p-tertiarybutyl catechol, the said compounds being used in each case in approximately equal amounts.

JOHN R. GOERTZ.

REFERENCES CITED

The following references are of record in the file of this patent:

UNITED STATES PATENTS

| Number | Name | Date |
|---|---|---|
| 2,234,211 | Walker | Mar. 11, 1941 |
| 2,494,087 | Daniels | Jan. 10, 1950 |

OTHER REFERENCES

Dunbrook, India Rubber World, January 1948, pp. 486 and 552.